United States Patent [19]

Musgrove et al.

[11] 4,216,990
[45] Aug. 12, 1980

[54] WATERPROOF TRUCK BED COVER

[76] Inventors: Donovon E. Musgrove; Wilbur D. Vos; Lyle D. Valintine, all of Sully, Iowa 50251

[21] Appl. No.: 920,134

[22] Filed: Jun. 28, 1978

[51] Int. Cl.² .............................................. B60J 7/10
[52] U.S. Cl. ..................................... 296/213; 280/433
[58] Field of Search ................ 296/137 B, 24, 137 R, 296/137 E; 280/423 B, 433, 423 R

[56] References Cited

U.S. PATENT DOCUMENTS

| | | | |
|---|---|---|---|
| 3,336,050 | 8/1967 | Dale | 280/423 R |
| 3,649,072 | 3/1972 | Cross | 296/137 B |
| 3,936,077 | 2/1976 | Bliek | 296/137 B X |

FOREIGN PATENT DOCUMENTS 2245084  3/1974  Fed. Rep. of Germany ....... 296/137 E

*Primary Examiner*—John J. Love
*Assistant Examiner*—Norman L. Stack
*Attorney, Agent, or Firm*—Zarley, McKee, Thomte, Voorhees & Sease

[57] ABSTRACT

A waterproof truck bed cover for pick-up trucks having a fifth wheel attachment within the truck bed is disclosed comprising a rigid frame removably secured to the truck bed and extending between the bed walls to dwell approximately in the horizontal plane of the upper edges of the side wall with the frame having both rearwardly extending and transversely extending brace elements. Rigid panel elements are attached to the brace elements to cover the truck bed and the brace elements contain water drain channels or troughs therein connected to drain conduits having discharge ports located exterior to the truck bed so that water is effectively drained away from the truck bed cover through the drain channels, through the drain conduits and discharged remote from the truck bed. The panel elements cover the truck bed while the drain channels and drain conduits effectively run off the water to substantially waterproof the interior of the truck bed. The frame has an opening formed therein extending forwardly from the rearward end of the bed to the fifth wheel to allow connection of the king pin of a trailer to the fifth wheel. Panel members detachably secure to the frame to cover this opening when the trailer is not in use and these panel elements interlock with the brace elements to form a secure water tight covering that withstands the force of air flow during travel and prevents turbulence in the truck bed.

7 Claims, 7 Drawing Figures

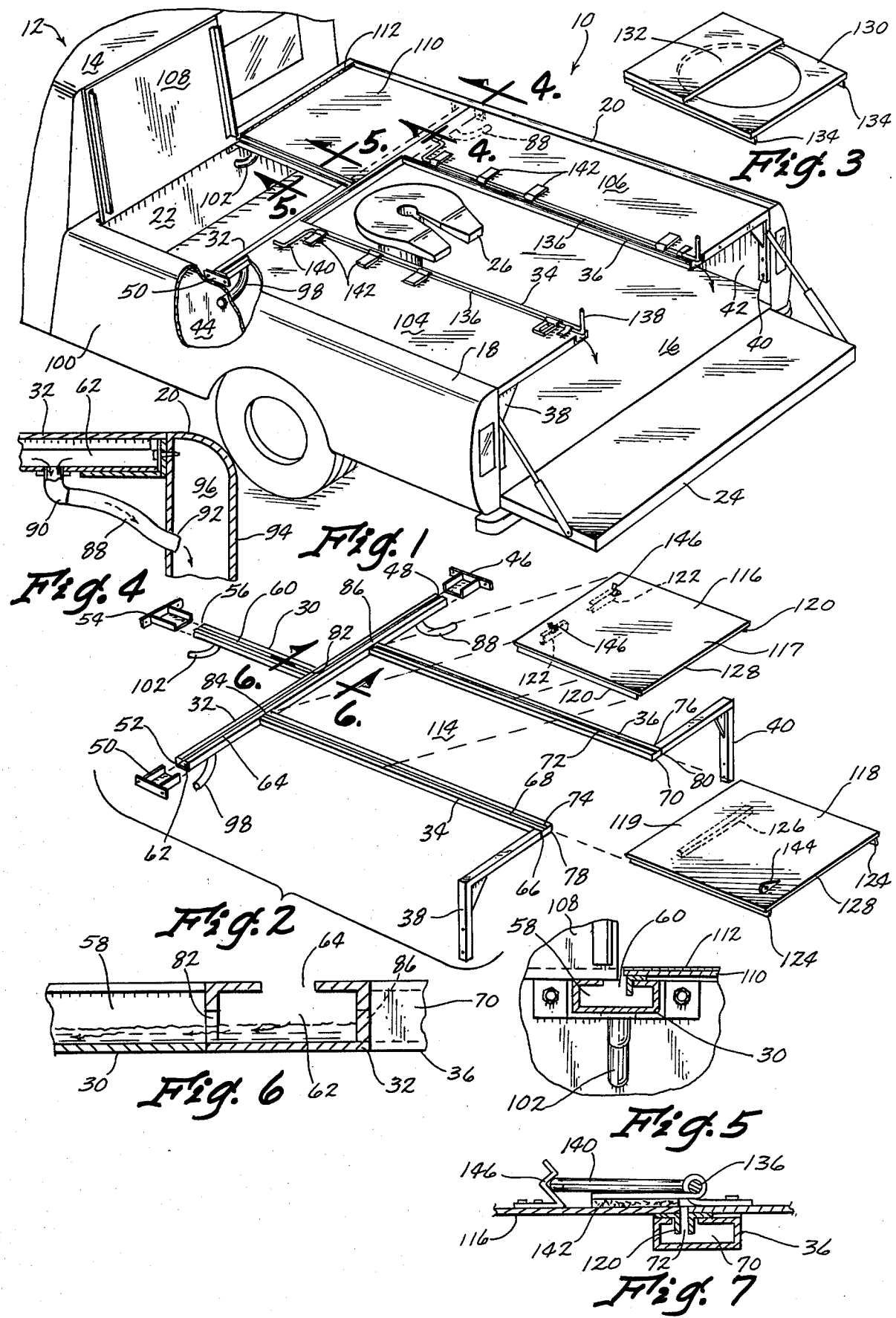

WATERPROOF TRUCK BED COVER

BACKGROUND OF THE INVENTION

This invention relates to a truck bed cover for use with pick-up trucks having a fifth wheel attachment mounted in the bed thereof and particularly to a substantially waterproof truck bed cover.

The fifth wheel camper trucks generally have a fifth wheel mounted in the box or bed which is adapted to detachably receive the king pin of the trailer which extends downwardly from the forward end thereof. Whether pulling a trailer or not, it is desirable to enclose the truck bed to eliminate air turbulence created in the truck box as such turbulence not only blows objects from the box but greatly reduces the gas mileage of the truck. The enclosed truck bed provides much needed storage space in the truck, especially when camping; however, leakage problems of prior truck bed covers has greatly reduced the range of articles that can be stored therein. Convenient access to the interior of the truck bed is required and easy detachment of the panels covering the fifth wheel is needed to assure convenient use. These requirements, together with the air draft forces on the cover during travel greatly contributed to the leakage problems of a truck bed cover.

BRIEF DESCRIPTION OF THE DRAWINGS

FIG. 1 is a partially broken away perspective view of a truck having the device of this invention mounted thereon.

FIG. 2 is a perspective view of the frame assembly with the detachable panels shown in exploded sequence.

FIG. 3 is a perspective view of the flexible seal.

FIG. 4 is an enlarged sectional view seen on line 4—4 of FIG. 1.

FIG. 5 is an enlarged sectional view seen on line 5—5 of FIG. 1.

FIG. 6 is an enlarged sectional view seen on line 6—6 of FIG. 2.

FIG. 7 is an enlarged sectional view of a panel interlocking with a brace.

SUMMARY OF THE INVENTION

A waterproof truck bed cover for pick up trucks having a fifth wheel attachment is disclosed and comprises a frame assembly of brace elements detachably secured to the bed of the truck with the brace elements having water drain channels or troughs therein to drain off water from the surface of the truck cover. The braces are disposed longitudinally and transversely within the truck bed and are integrally interconnected with the respective channels thereof fluidly connected. The longitudinally disposed braces in the rearward portion of the truck bed have a discharge port at the rearward end of the bed such that water may drain rearwardly to the exterior of the bed. Drain conduits are fluidly connected to the transverse brace channel and the remaining longitudinal brace channel to provide drainage of water through the conduits to the exterior of the bed. Panel elements are securely attached to the frame structure to enclose the truck bed with the panel members above the fifth wheel being detachably secured to the frame to allow interchange with the seal element for use with the king pin of the trailer. The detachably secured panel members are of interlocking construction to securely engage each other and securely engage the frame structure so as to provide waterproof construction and rugged resistance to air draft forces during travel. A pivotal locking means secures the removable panels in place with a padlock to prevent theft and vandalism. The forward panels are pivotally secured to the forward wall of the bed of the truck to allow easy access to the interior for storage purposes.

Therefore, it is a principal object of this invention to provide an improved truck bed cover for pick-up trucks having a fifth wheel attachment.

A still further object of the invention is to provide a substantially waterproof truck bed cover to prevent leakage into the truck bed.

A still further object of the invention is to provide a truck bed covering allowing easy access to the interior of the bed yet preventing water leakage therein.

A still further object of the invention is to provide a truck bed cover that provides interlocking removable panels above the fifth wheel with the panels interlocking with the frame to resist air turbulence yet prevent water leakage at the securement points thereof.

A still further object of the invention is to provide a truck bed cover having a frame structure that effectively drains water off of the truck bed cover to the exterior of the bed.

A still further object of the invention is to provide a truck bed cover having a drain conduit connected thereto to effectively drain water through the truck bed body.

A still further object of the invention is to provide a substantially waterproof truck bed cover that prevents water from entering the truck bed while a trailer is attached to the fifth wheel.

A still further object of the invention is to provide a locking means to secure the removable panels in place when a trailer is not connected to the fifth wheel.

A still further object of the invention is to provide a waterproof truck bed cover having a frame means that drains outwardly from the rear portion of the truck bed.

A still further object of the invention is to provide a waterproof truck bed cover which is economical to manufacture, durable in use, refined in appearance, and easily assembled and disassembled from a truck bed.

DESCRIPTION OF THE PREFERRED EMBODIMENT

The waterproof truck bed cover of this device is generally designated by the numeral 10 and is shown attached to a pick-up truck 12 in the partially broken away perspective view of FIG. 1.

Pick-up truck 12 is a conventional style pick-up truck having a cab 14 and a truck bed 16 formed by opposite side walls 18 and 20, forward wall 22 and tailgate 24. Truck bed 16 has a conventional fifth wheel 26 for attachment to the king pin (not shown) of a trailer to be pulled by the pick-up truck.

The basic support structure of truck bed cover 10 is the frame assembly 28 shown in FIG. 2. Frame assembly 28 is adapted to be detachably secured within truck bed 16 as shown in FIG. 1 and comprises forward brace element 30, transverse brace element 32, and spaced apart rearward brace elements 34 and 36. Brace elements 30, 32, 34, and 36 are interconnected as shown in FIG. 2 by conventional means. Bracket mounts 38 and 40 are securely attached to the rearward ends of brace elements 34 and 36, respectively, to allow detachable securement to the inner walls of sidewalls 18 and 20.

Bracket mount 40 securely attaches brace element 36 to inner wall 42 of side wall 20 by conventional bolt or screw means while bracket mount 38 securely attaches brace element 34 to inner wall 44 of side wall 18.

Bracket mount 46 slidably receives end 48 of transverse brace element 32 and in turn is detachably secured to inner wall 40 by bolts or the like. In a similar manner, bracket mount 50 secures the other end 52 of brace 32 to inner wall 44 and bracket mount 54 secures the forward end 56 of forward brace element 30 to forward wall 22 of truck bed 16. Thus, frame assembly 28 is detachably secured to truck bed 16 in a manner that allows quick and easy assembly and disassembly yet provides a sturdy integral attachment to truck bed 16 to support the panel elements described hereinafter in a manner to withstand the draft forces from air flow during travel. Forward brace element 30 is of channel like construction to form a drain channel 58 having an upwardly disposed groove 60 as shown in FIG. 5. Both drain channel 58 and groove 60 providing fluid communication with channel 58 extend longitudinally for the length of forward brace element 30. Transverse brace element 32, rearward brace element 34, and rearward brace element 36 are of identical construction. The transverse brace element 32 has a channel 62 with an upwardly disposed groove 64 communicating therewith. Rearward brace element 34 has a channel 66 with an upwardly disposed groove 68. Rearward brace element 36 has a channel 70 with an upwardly disposed groove 72. Grooves 68 and 72 are slightly offset from the longitudinal center lines of channels 66 and 70, respectively, as illustrated in FIG. 7, while grooves 64 and 60 are directly above the longitudinal center lines of channel 62 and 58, respectively, as illustrated in FIG. 5.

The rearward end 74 of brace 34 has a rearward disposed port 78 in fluid communication with channel 66 so that drain water in channel 66 may drain rearwardly out of port 78 rearward of bed 16 as indicated by the arrows in FIG. 1. In an identical manner, the rearward end 76 of brace 36 has a rearwardly disposed port 80.

Drain channel 58 of brace 30 is fluidly connected to drain channel 62 of brace 32 by bore 82. In a similar manner, drain channel 62 of brace 32 is fluidly connected to drain channel 66 of brace 34 by bore 84 and is connected to drain channel 70 of brace 36 by bore 86. Thus, all of the drain channels are fluidly interconnected although, as will be described in more detail hereinafter, the structure will effectively drain without the use of bores 84 and 86 but their presence is preferable.

A number of drain conduits provide fluid communication between the drain channels and the exterior of the truck bed to allow effective drainage to points exterior of the truck bed. Drain conduit 88 is fluidly connected to drain channel 62 of brace 32 via elbow 90 as shown in FIG. 4. The discharge end 92 of drain conduit 88 is disposed in chamber 96 between the inner wall 42 and the outer wall 94 of side wall 20. The chamber 96 formed by inner wall 42 and outer wall 94 has a drain means at the bottom thereof (not shown) in a conventional pick-up truck bed body. Therefore, water is allowed to drain from channel 62 through elbow 90 and conduit 88 into chamber 96 as indicated by the arrows in FIG. 4 and then outwardly through this conventional drain means to the exterior of the truck body. In a similar manner, drain conduit 98 is in fluid communication with channel 62 at the opposite end of brace 32 and allows drainage between inner wall 44 and outer wall 100 of outside wall 18 as shown in the breakaway portion of FIG. 1.

Drain conduit 102 is fluidly connected to drain channel 58 adjacent the forward end 56 of brace element 30 in a manner similar to drain conduits 88 and 98. However, drain conduit 102 passes through forward wall 22 of truck bed 16 with the discharge port (not shown) located between cab 14 and forward wall 22 allowing drainage therebetween.

Panel members provide the covering of truck bed 16 with panel member 104 being securely mounted to brace element 34, bracket mount 38 and a portion of brace element 32 and panel member 106 being securely mounted to rearward brace element 36, bracket mount 40 and a portion of brace element 32 as shown in FIG. 1. Forward panels 108 and 110 are pivotally mounted to forward wall 22 by hinge 112 to provide easy access to the interior of truck bed 16. Panel 108 is shown in FIG. 1 in an open position to allow access, while panel 110 is shown in the normal closed position for travel.

As can be seen in FIG. 2, brace element 34 and 36 define an opening 114 in frame assembly 28 extending from the rearward end of the truck bed forwardly to a position above fifth wheel 26 to facilitate attachment of the king pin to fifth wheel 26. When the truck is not being used to tow a trailer, opening 114 is enclosed by panel members 116 and 118 as shown in exploded sequence in FIG. 2. Panel 116 comprises a pair of oppositely downwardly extending flange elements 120 that are slidably received by grooves 68 and 72 of brace elements 34 and 36, respectively (see FIG. 7). This slidable engagement provides securement against transverse horizontal movement while forwardly disposed flange elements 122 slidably receives the middle portion of transverse bracket 22 to provide an integral fit and securement against vertical movement of panel 116. Thus, panel 116 may be slidably inserted into opening 114 and easily secured to frame assembly 128. In a similar manner, panel element 118 covers the remaining portion of opening 114 with downwardly extending flange elements 124 being received in grooves 68 and 72. Panel element 118 also comprises a forwardly extending flange element 126 to slidably receive the rear edge 128 of panel 116. This provides securement to panel 116 that is resistive to vertical movement while flange elements 124 provide resistance to transverse horizontal movement. In this position the forward portion 119 of panel 118 extends over the rearward portion 117 of panel 116 to cover the interface between panels 116 and 118 and prevent leakage.

When panels 116 and 118 are secured in place as described above, and panels 108 and 110 are in their downward position, the interior of truck bed 16 is substantially waterproof. Any water landing on the truck bed cover will eventually drain off the truck bed cover or through one of the grooves into one of the drain channels. Because of the reception of the flange element of the various panels into the grooves, water is prevented from working its way under the panels and is restricted to draining into the drain channels. Once the water is in any one of the drain channels, it eventually drains out of one of the drain conduits 88, 98, or 102, or out port 78 or 80 of brace elements 34 and 36. The distribution of weight in the truck and forces due to movement of the truck will effect the direction of flow of water in the drainage means.

When the king pin of a trailer is connected to fifth wheel 26, panel 130 having seal element 132 and downwardly extending flange elements 134 (FIG. 3) replaces panel element 116 with seal element 132 sealably engaging the king pin.

A locking pin assembly is provided to secure panels 116 and 118 in place to prevent unauthorized access to the truck bed 16. Elongated bar 136 is pivotally secured to the inboard edge of panel 104 and comprises a radially extended rear portion 138 and a radially extended forward portion 140. Radially extending tabs 142 are securely attached to bar 136 in a common plane with forward portion 140. Referring to the position of bar 136 in FIG. 1, the panels 118 and 116 would be secured in place after insertion by rotation of rearward portion 138 in a clockwise direction thereby bringing pads 142 into contact with panels 116 and 118. Spring clamp 146 detachably secures forward portion 140 to panel 116. A padlock means 144 then provides a simple means of locking the bar in place to prevent removal of panels 116 and 118. In this position, rear portion 138 of bar 136 would be downwardly disposed on the outer surface of the closed tailgate 24. This would prevent tailgate 24 from being opened. Panels 108 and 110 are provided with conventional key locking means to secure them in place. Thus, the interior of truck bed 16 is securely locked from unwanted intrusion.

Thus, it can be seen that this device accomplishes at least all of its stated objectives.

What is claimed is:

1. In combination with a pick-up truck having a bed with rearward and forward ends, opposite sides of upstanding side walls with the upper edges of said side walls defining a horizontal plane and a fifth wheel within said bed below said upper edges, a bed cover, comprising, a rigid frame means removably secured to said bed and extending between said walls to dwell approximately in said horizontal plane, said frame means having first brace means extending rearwardly and second brace means extending laterally, said first and second brace means each having a drain channel therein for the drainage of water, drain means fluidly connecting said channels to the exterior of said bed so that water in said channels drains to said exterior, and rigid panel means attached to said frame means to cover said bed, said second brace means comprising a first support member extending laterally between and connected to said opposite upstanding side walls and said first brace means comprising a second support member attached to and rearwardly extending from said forward end of said bed to said first support member, said second member being connected to said first member, third and fourth support members spaced apart and rearwardly extending from said first support member to said rearward end of said bed, said third and fourth members being attached to said first support member, each said support member having a drain channel therein for the drainage of water.

2. The combination of claim 1 wherein said drain channel of said first support member is fluidly connected to said drain channel of said second support member, said drain channel of said first support member is fluidly connected to said drain channels of said third and fourth support members, and the rearward portion of said drain channels of said third and fourth support members each having an opening therein disposed outwardly from said rearward end of said bed so that water can drain from said drain channel through said opening to the exterior of said bed.

3. In combination with a pick-up truck having a bed with rearward and forward ends, opposite sides of upstanding side walls with the upper edges of said side walls defining a horizontal plane and a fifth wheel within said bed below said upper edges, a bed cover, comprising, a rigid frame means removably secured to said bed and extending between said walls to dwell approximately in said horizontal plane, said frame means having first brace means extending rearwardly and second brace means extending laterally, said first and second brace means each having a drain channel therein for the drainage of water, drain means fluidly connecting said channels to the exterior of said bed so that water in said channels drains to said exterior, and rigid panel means attached to said frame means to cover said bed, said drain means comprising a first conduit means fluidly connected at one end to said drain channel of said first brace means and having a discharge port at the other end located exterior of said bed, and a second conduit means fluidly connected at one end to said drain channel of said second brace means and having a discharge port at the other end located exterior of said bed.

4. The combination of claim 3 wherein said discharge port of said first conduit means is disposed between said forward wall of said bed and the cab of said truck, and said discharge port of said second conduit means is disposed between the inner and outer walls of said side wall of said bed.

5. In combination with a pick-up truck having a bed with rearward and forward ends, opposite sides of upstanding side walls with the upper edges of said side walls defining a horizontal plane and a fifth wheel within said bed below said upper edges, a bed cover, comprising, a rigid frame means removably secured to said bed and extending between said walls to dwell approximately in said horizontal plane, said frame means having first brace means extending rearwardly and second brace means extending laterally, said first and second brace means each having a drain channel therein for the drainage of water, drain means fluidly connecting said channels to the exterior of said bed so that water in said channels drains to said exterior, and rigid panel means attached to said frame means to cover said bed, said frame means having an opening formed therein above said fifth wheel, said panel means comprising covering means detachably secured to said frame means and covering said opening in said frame means, said covering means being detachable from said frame means to selectively permit a king pin of a trailer to extend downwardly through said opening for connection to said fifth wheel, a locking means to selectively secure said covering means to said frame means being attached to said panel means, said locking means comprising, a rod element pivotally mounted to said panel means and extending forwardly from said rearward end of said bed, said rod element having a radially extending rearward end portion, a plurality of tabs attached to said rod and extending radially therefrom for engagement with said covering means and a padlock means connected to said rod element and said covering means to selectively lock said tabs into engagement with said covering means.

6. The combination of claim 5 wherein said covering means comprises first and second rigid panel elements, said first panel element being disposed forwardly in said opening and having a first forwardly extending flange means to slidably receive said second brace means in vertical interlocking engagement and a second downwardly extending flange means for slidably reception by said drain channels of said first brace means in horizontal interlocking engagement.

said second panel element being disposed rearwardly of said first panel element and having a first forwardly extending flange means to slidably receive the rearward edge of said first panel element in vertical interlocking engagement and a second downwardly extending flange means for slidably reception by said drain channels of said first brace means in horizontal interlocking engagement.

7. The combination of claim 5 wherein said covering means comprises a third panel element, said third panel element having an opening formed therein above said fifth wheel to permit the king pin to extend downwardly therethrough and a seal means positioned over the forward portion of said opening to sealingly engage said king pin.

* * * * *